United States Patent [19]

Curtin et al.

[11] Patent Number: 4,629,831
[45] Date of Patent: Dec. 16, 1986

[54] SERIES CONNECTED INTERCEPTOR

[75] Inventors: William J. Curtin; Stephen Soto, both of Madison; Steven Krueger, Windsor, all of Wis.

[73] Assignee: Amtel Communications, Inc., McFarland, Wis.

[21] Appl. No.: 579,530

[22] Filed: Feb. 13, 1984

[51] Int. Cl.⁴ ........................ H04M 3/50; H04M 3/54
[52] U.S. Cl. ..................................... 379/213; 379/233
[58] Field of Search ........ 179/27 FH, 27 FG, 18 BE, 179/18 B, 18 AD

[56] References Cited

U.S. PATENT DOCUMENTS

| | | | |
|---|---|---|---|
| 3,521,003 | 7/1970 | Andersson et al. | 179/18 BE |
| 3,963,875 | 6/1976 | Gueldenpfennig | 179/27 CA |
| 4,401,856 | 8/1983 | Curtin et al. | 179/27 FH |
| 4,484,031 | 11/1984 | Gray et al. | 179/18 BE |
| 4,529,841 | 7/1985 | Andersson et al. | 179/18 BE |

Primary Examiner—Thomas W. Brown
Attorney, Agent, or Firm—Robert E. LeBlanc

[57] ABSTRACT

The series connected interceptor is a control system for assisting in providing improved service operations for a PBX system. This control system is connected in series in a DID trunk between a TELCO central office and a PBX. By the nature of where it is connected and its function, the control system enables a telephone answering service to sense when an incoming DID call has rung on an extension for a predefined number of rings and to answer such call with the identity of the extension being called. The control system also can provide incoming DID call screening or call forwarding.

44 Claims, 11 Drawing Figures

SERIES CONNECTED INTERCEPTOR

BACKGROUND OF THE INVENTION

The present invention involves a control system for enabling telephone answering services to be provided to various telephone extensions within a PBX system for handling of incoming calls from a telephone central office.

In order to provide each of the telephone extensions of a PBX system with telephone answering services, a control system has been interconnected between the PBX system and each of the telephone extension lines. This control system monitors each of the incoming calls received on the telephone extension lines and either allows the transfer of such calls to the various extensions within the PBX system or answers such calls.

In order to enable each of the end users within the PBX system to obtain telephone answering services, it has been necessary to place across each of the extension lines in the PBX system a tip/ring monitor for counting the number of rings on the extension line in the PBX system. Thus, each end user, or subscriber, in the PBX system is able to select the number of rings after which the telephone answering service coupled to the control system will answer the incoming call directed to such subscriber. In order to accomplish this, the number of rings on the subscriber line has been counted and then after a certain number of rings has been reached without the subscriber answering his phone, i.e. without the phone going off-hook, the call has then been transferred to the telephone answering service. In order to monitor the number of rings on a subscriber line, it is necessary to place across each of the extension lines a tip/ring scanner or monitor.

An example of a telephone answering system that can be used in such arrangement or in conjunction with the present invention is the EVE system sold by AMTEL Communications, Inc.

Direct inward dialing DID was brought about to allow a caller to bypass the bottleneck of the switchboard and call directly to a person's desk or an area of interest in a company office or plant. For this purpose, an incoming DID trunk line sends the desired destination extension number to the PBX for automatically distributing an incoming call to the appropriate telephone within a PBX system. These DID numbers that come in on the DID trunk lines are very inexpensive as compared to ordinary telephone numbers that are rented from the telephone company. It is common for many businesses to order 100 numbers at a time. When 100 numbers are ordered, however, usually just a few pair of wires (access lines) need to be provided from the telephone company to the numbers actually being served within the business location.

A series connected telephone answer system that is connected to terminals in the main switching frame of TELCO (telephone central office) is disclosed in commonly assigned U.S. patent application Ser. No. 285,938 to Curtin filed July 23, 1981.

SUMMARY OF THE INVENTION

An object of the present invention is to provide a control interceptor connected in series between a telephone central office and a PBX system for monitoring calls directed to such PBX system.

Another object of the present invention is to provide a series connected control interceptor between a telephone central office and a PBX system for enabling more efficient monitoring and screening of calls directed to the telephone extensions within the PBX system and enabling each of these extensions to be efficiently provided with telephone answering services.

A further object of the present invention is to provide a control interceptor interconnected between a DID trunk line from a telephone central office and a PBX system for directing calls received on the DID trunk line to the various extension stations within the PBX system and providing an improved mechanism for monitoring and screening calls directed to the telephone extensions for enabling efficient telephone answering services to be provided for each such extension station.

Still another object of the present invention is to provide a control interceptor for interconnection between a telephone central office and a PBX system which enables each incoming call directed to a telephone extension in the PBX system to be monitored so that after a selected period of time such call can be answered by a telephone answering system if not answered at the extension within the PBX system.

A still further object of the present invention is to provide a control interceptor for interconnection between a telephone central office and a PBX system for monitoring and screening calls directed to telephone extensions within the PBX system and eliminating the need for any tip/ring scanners to be used on the extensions within the PBX system.

A still further object of the present invention is to provide a series connected interceptor that eliminates the need for using tip/ring scanners on every telephone extension in a PBX system to determine if an incoming call directed to such extension has rung past a pre-determined number of rings for incoming DID outside calls, so as to allow call screening on a per extension basis and allow each of the users within the PBX system to have a more flexible answering service.

Answering services can be provided by using the control system of the present invention between the central office to PBX DID trunk line and the PBX. The use of the control system of the present invention allows the removal of each of the PBX extension tip/ring monitors. Since a PBX typically has many more extensions than DID trunks, a few of these control systems replace many tip/ring monitors. This provides a major cost benefit to a telephone answering system that uses the present invention. This control system also allows telephone answering service to be provided on telephones which employ digital operation (do not use a tip/ring line).

The control system of the present invention can decode the extension number the call is for and the number of the unanswered rings. It therefore is possible for the answering service to be able to identify whose line is being called and can answer with the particular name of the person whose station is being called without the use of tip/ring monitors. A business with a PBX obtains from the telephone company a block of telephone numbers, e.g. 100 numbers, which are assigned to a particular PBX system and each block of telephone numbers is coupled to the PBX through an access line (called a DID trunk). For example, if a telephone number being called is 765-4321, then the destination's central office sends either the last 3 or 4 digits (321 or 4321) to an un-used (idle) DID trunk to a PBX. The PBX receives the 3 or 4 digit number from the central office, rings the correct extension on the PBX and then connects the two parties in a conversion. The control system of the present invention is connected in series in between a central office and a PBX.

The series connected interceptor of the present invention is interconnected between a telephone central office (TELCO), normally a DID trunk line extending from TELCO, and a PBX system. This series connected interceptor in its interconnection to the telephone central office looks like a PBX DID trunk line. At the other end, the series connected interceptor looks to a PBX system like a TELCO DID trunk line. The series connected interceptor once it interconnects the incoming call on the DID trunk line to the extension station within the PBX system has a relay for allowing a voice path to be closed between these two interfaces.

The series connected interceptor of the present invention receives from the telephone central office several, e.g. three or four, numbers that indicate the particular PBX extension being called. The series connected interceptor redials this number, or another extension number if the incoming call is to be call forwarded (or screened) to a different extension, to the PBX system and commences operation of a timing circuit. If the series connected interceptor has not received a battery reversal after a predetermined amount of time (one ring equals six seconds), the interceptor knows that the extension telephone in the PBX system has not been answered. Over an additional data interface, the interceptor then informs a telephone answering system that it should activate a directed call pick-up, which is a standard PBX feature, for that particular extension telephone so as to retrieve and answer the ringing incoming call. This data path also can be used for driving a numeric display with the extension number or extension code which needs to have its call picked up so that the telephone extension being called is identified to the operator of the telephone answering system.

The series connected interceptor of the present invention also can serve for screening each of the incoming calls directed to the various extension stations in the PBX system. Depending upon the particular telephone number received from the TELCO DID trunk line, the interceptor can look up in its memory table what code it should send out and where such call should be directed. This allows call screening on a per telephone extension station basis.

In addition, since the interceptor of the present invention is connected in a series connected between the telephone central office and the PBX system, the interceptor is capable of redirecting incoming calls received on the DID trunk line from one telephone extension in the PBX system to another telephone extension before the call has actually entered the PBX system. Thus, by selectively changing the information stored within the interceptor in its RAM, an incoming call originally intended for one telephone extension within a PBX can be call forwarded to another telephone extension within the PBX system without the call actually having to be sent through the PBX system itself. For this purpose, the interceptor is provided with a RAM capable of storing information pertinent to each of the telephone extensions in the PBX system. When an incoming call is received, the interceptor decodes the call to determine what telephone extension in the PBX system is being called. The interceptor then searches its RAM memory to determine where such incoming call should be sent, i.e. such incoming call can be sent to the particular telephone extension being called or call forwarded or redirected to a different telephone extension based upon the information stored in the RAM.

The interceptor of the present invention includes: a microprocessor system, including a microprocessor such as a Z80 microprocessor; a plurality, e.g. four, sets of interface boards; and I/O ports. Each of the interface boards is a two part interface. The first port is a current source port which is connected to the incoming DID trunk line from the telephone central office. The other port is a current sink port which is connected to the PBX system. The current source port is capable of detecting an off/on hook condition, sending ring voltage signals and detecting an answer signal and looks like a PBX DID interface to the telephone central office (TELCO). The current sink port can send dial pulses, can go on/off hook and looks like TELCO to a PBX system with a DID interface.

The interceptor of the present invention is interconnected between the DID trunk line from the PBX and the DID trunk line from TELCO. During operation, the TELCO DID trunk is connected to the interceptor current source port and TELCO thinks that it is talking to a PBX. At the other end, the PBX DID trunk line is connected to the interceptor and the PBX thinks that it is talking to TELCO.

The interceptor has a table of information associated with each of the telephone extensions within the PBX system that is loaded into its RAM memory. This table can include information for up to 1000 entries (i.e. for 1000 different telephone extensions). Each entry consists of the DID extension number that the interceptor should outpulse if it receives a call for that extension and a time period ring count for that extension. The time period ring count can be anywhere from 0 to a maximum number, e.g. 16. One ring equals six seconds. The interceptor interprets a time period time count of 16 as infinity (never reached) and when such a count is entered for any particular extension then an incoming call directed to such extension will not be interrupted and sent to the telephone answering system for answering.

If the information stored in a table for a particular extension includes a time period ring count of 0, then the interceptor will not outpulse the code signal from the table entry for transmitting the incoming call to the telephone extension, but instead will transfer such incoming call to the telephone answering system. When this occurs, the interceptor sends a message to the telephone answering system over its serial link. The telephone answering system will then display the call as ringing. When an operator at the telephone answering system answers the call, the telephone answering system sends a single message back to the interceptor with a designation identifying the particular operator to which the call should be transferred. The interceptor then dials the number associated with such operator and cuts through the voice path within the system and sends a confirmation message to the operator.

If the interceptor receives an extension number with a time period ring count of between 1 and 15, the interceptor will outpulse the extension number in the table of information for that particular extension, will cut through the voice path so as to begin ringing the telephone extension being called, and will start a timer within the interceptor. Once the indicated number of rings has exceeded the ring count, which is determined by the time period during which ringing of the telephone extension has occurred, with the interceptor not receiving a battery reversal (answer signal) from the PBX or a TELCO disconnect, the interceptor sends a single message to the telephone answering system with the PBX extension number that the interceptor outpulsed and the extension number it received from TELCO. The telephone answering system will display this as a ringing call and is capable of receiving such call in a manner set forth above.

In utilizing the interceptor of the present invention, an example of the type of telephone answering system to which the interceptor can be coupled is an answering system sold by AMTEL Communications, Inc. under the designation EVE.

DESCRIPTION OF THE PREFERRED EMBODIMENT

Figure 1:
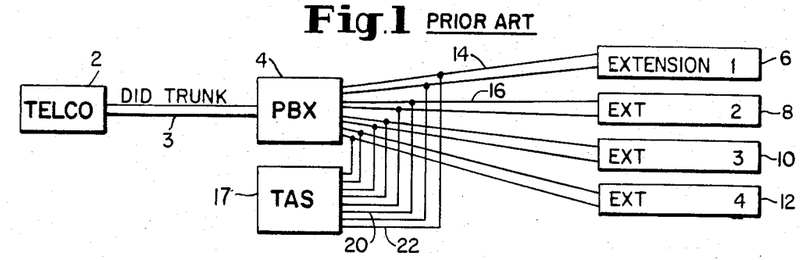
FIG. 1 is a block diagram of a prior art system illustrating the interconnection of a telephone answering system for servicing of the telephone extensions within a PBX system.

In the past, when a telephone answering service (TAS) was to be connected into a PBX system for servicing the various extensions within the system, it was necessary for the TAS to be connected across and to monitor each of the tip/ring lines of each extension within the system. Such a prior art system is shown in FIG. 1. The DID trunk line 3 extends from TELCO 2 to PBX 4. The PBX 4 then separates the calls and directs them to the appropriate telephone extension, such as extensions 6, 8, 10 and 12. Typically, a PBX might have up to 1000 extensions that are serviced by a single incoming DID trunk line. The telephone answering service is coupled to the tip/ring lines such as lines 14 and 16 from the lines 20 and 22 extending from a TAS 17 for monitoring the calls directed to each of the extensions. TAS 17 includes a separate tip/ring monitor for monitoring the rings and counting such rings on each of the tip and ring lines extending to each of the telephone extensions within the PBX system.

Figure 2:
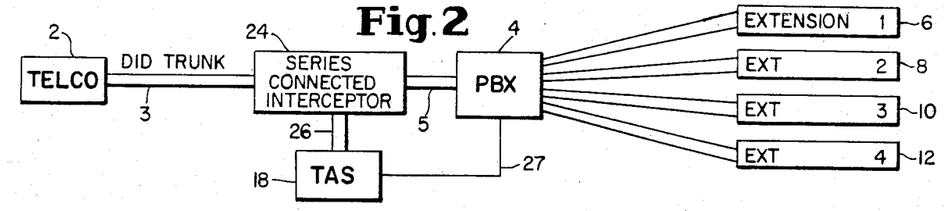
FIG. 2 is a block diagram of a system in accordance with the present invention in which a series connected interceptor is connected between TELCO and the PBX.

In accordance with the present invention, a series connected interceptor 24 is inserted in the line between TELCO 2 and PBX 4. Series connected interceptor 24 is connected to DID trunk 3 and sends the incoming calls from DID trunk 3 to PBX 4 through an outgoing line 5. Series connected interceptor 24 looks like a PBX to TELCO 2 and at the same time looks like TELCO to PBX 4. TAS 18 is connected through a serial port to series connected interceptor 24 through line 26 unlike the prior art connection of a TAS. When a call is directed to any of the telephone extensions within the PBX systems such as extensions 6, 8, 10 and 12, the time period of the rings directed to such telephone extension is determined and when such time period has exceeded a preset time period, series connected interceptor 24 informs the TAS of the extension number that should be answered over its data link 26. The TAS system (or operator) now performs a directed call pickup on that extension over PBX telephone extension line 27. The call is now transferred to the TAS operator. Alternatively, the TAS operator could have its voice connected tied into the control interceptor by adding an additional relay switch in the interceptor and a talk battery current source.

Figure 3:
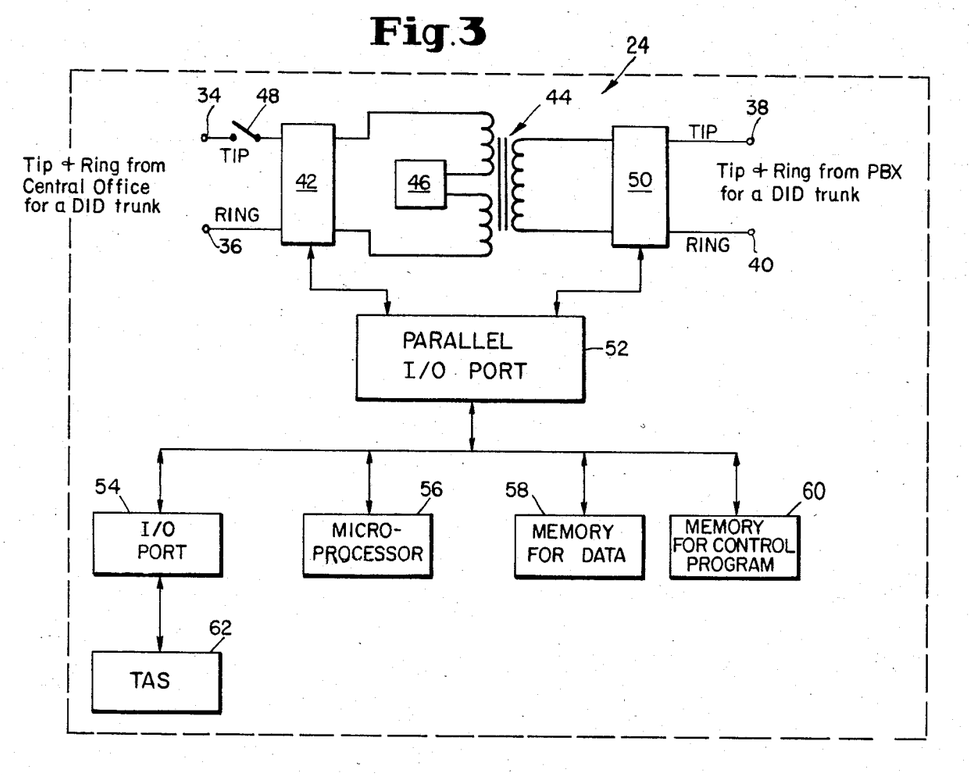
FIG. 3 is a block diagram of the series connected interceptor in accordance with the present invention.

A series connected interceptor in accordance with the present invention is shown in FIG. 3 as interceptor 24. Interceptor 24 has a source port interface and a sink port interface. The source port interface is connected through tip line 34 and ring line 36 to the tip and ring lines of the DID trunk line from TELCO. The sink port interface is connected through tip line 38 and ring line 40 to the DID trunk line to the PBX system. The source interface is shown by box 42 and the sink interface by box 50. The source and sink interfaces have the voice path coupled through transformer 44. A relay switch such as switch 48 is located in the input to interface 42; a similar switch also can be located across sink interface 50. Transformer 44 is driven by current drive circuit 46.

The operation of interface 42, current drive circuit 46 and interface 50 are controlled through microprocessor 56 which is coupled to such circuits through digital code converter (regular digital parallel I/O ports) 52. The memory and data for microprocessor 56 is stored within RAM memory 58. The memory for the control program is stored within memory 60 which can be either a ROM or a RAM. The interceptor is coupled to a telephone answering system 62 through input/output (I/O) port 54.

Figure 4:
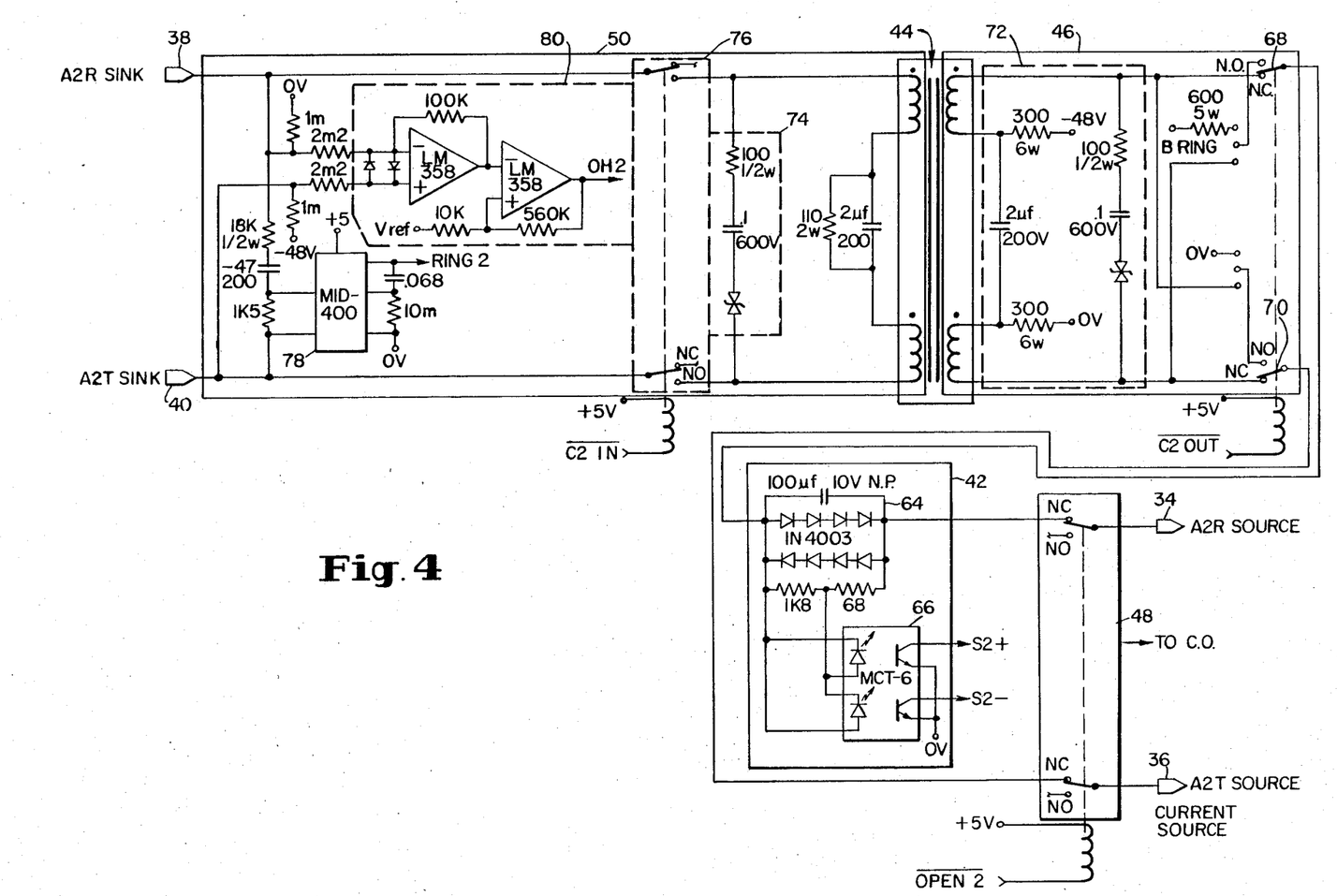
FIG. 4 is a schematic circuit diagram of one of the interface boards of the interceptor of the present invention.
Figure 11:
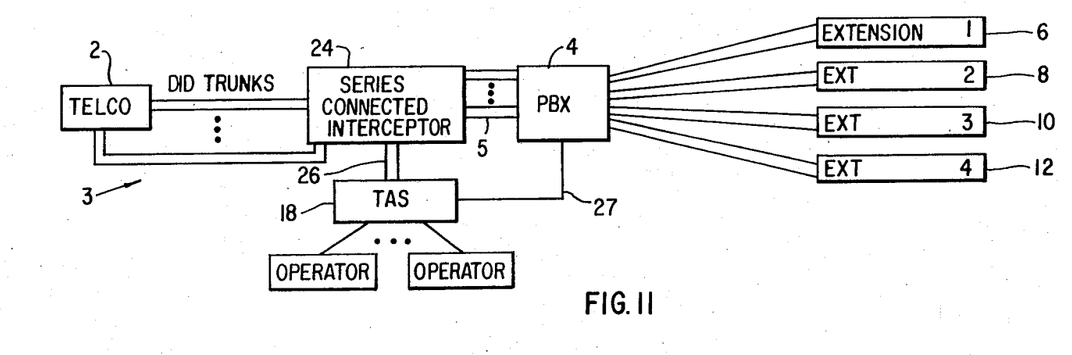
FIG. 11 is a block diagram of an alternate embodiment of the arrangement of FIG. 2.

Interceptor 24 can include several interface boards such as the interface board shown in FIG. 4. This arrangement is illustrated in the embodiment of FIG. 11. Such an arrangement is useful for permitting several telephone answering system operators to monitor a plurality of trunks. In accordance with the preferred embodiment of the present invention shown in FIG. 11, interceptor 24 includes four such interface boards. The tip/ring lines of the DID trunk line from TELCO are connected to lines 34 and 36. A relay switch 48 is provided across lines 34 and 36 at the input end of the interface board. Source interface 42 includes current limiting diode 64 and an integrated circuit optoelectronic coupler 66. The output from source interface 42 is coupled to the microprocessor for sensing on and off-hook conditions from the central office and processing digits received from the central office. Current drive circuit 46 includes relays 68 and 70 which are connected across the battery for reversing the direction of the current flow. Current drive circuit 46 further includes a battery feed circuit 72 which is connected to the coils on one side of transformer 44. The coils on the other side of transformer 44 are connected to the sink interface 50. Sink interface 50 includes transient suppressor 74, a relay switch 76 for going on/off hook for sending dial pulses, an integrated circuit optoelectronic coupler 78 and voltage sensor 80. Voltage sensor 80 is a level detection circuit which is used for detecting if the voltage across the tip/ring line of this sink interface which is connected to the PBX drops below 24 volts; if this occurs then the voltage sensor flips the output so it knows that a reversal of the battery indicating that the telephone extension within the PBX sysem has occurred, i.e. the telephone extension being called has been answered.

Figure 5:
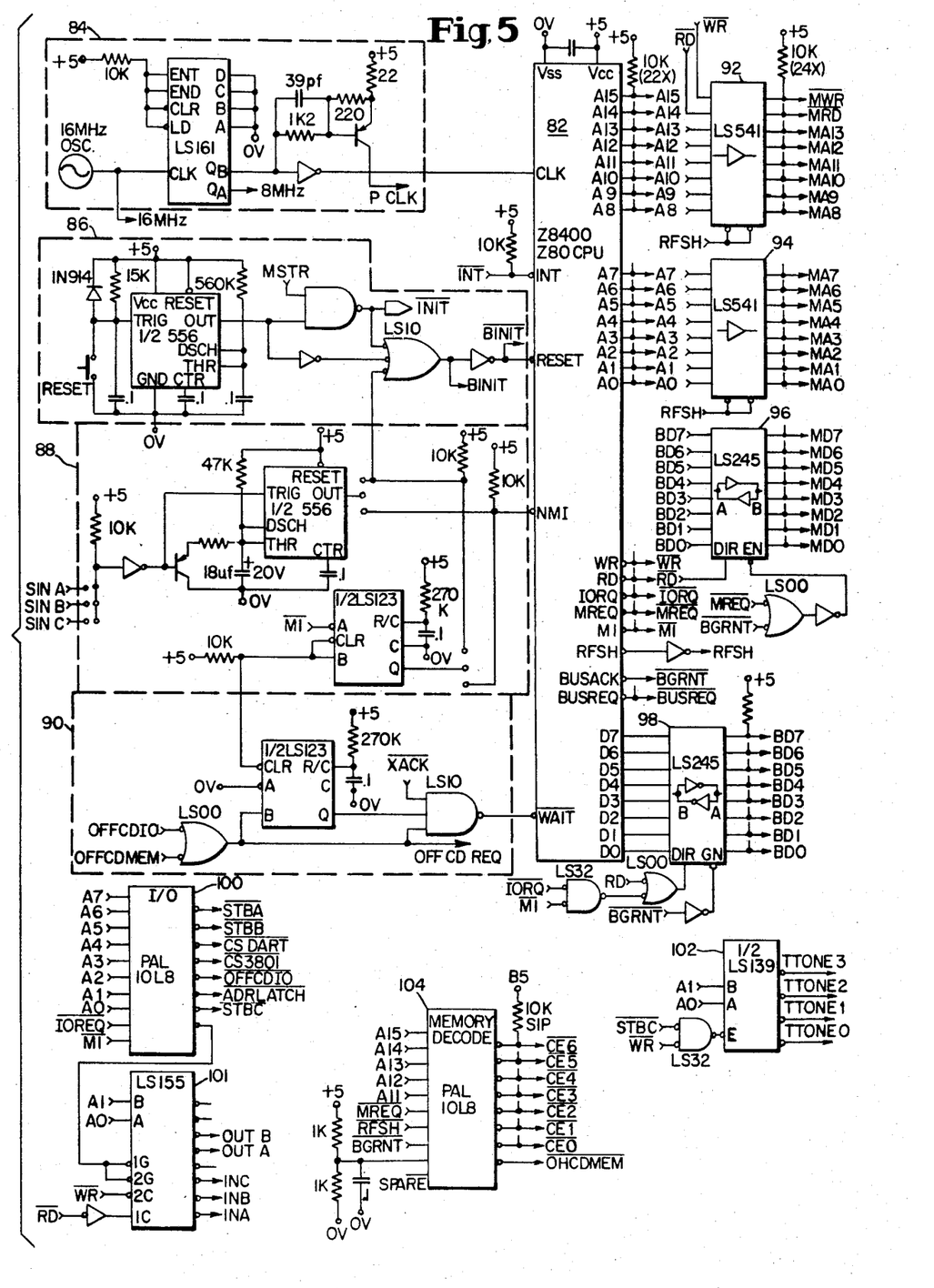
FIG. 5 is a schematic circuit diagram of a portion of the microprocessor section of the interceptor of the present invention.

The operation of interceptor 32 is primarily controlled by microprocessor 82 which is shown in FIG. 5. The timing of microprocessor 82 is controlled by clock pulse generator 84. A reset circuit 86 provides signals for resetting of microprocessor 82. Interrupt circuit 88 provides signals for interrupting microprocessor 82. Wait circuit 90 provides wait signals to microprocessor 82. Such wait signals are provided when the interceptor uses more than one interface circuit; then wait signals are provided for timing the operation of the different interface circuits.

A series of buffers 92 and 94 are provided between the memory and microprocessor 82. A further buffer 96 is provided as a memory address buffer for the microprocessor. A final buffer 98 is provided as a data line buffer.

The microprocessor section of the interceptor also includes an I/O decoder 100 and 101, interface strobes 102 and a memory decoder 104. The input/output decoder 100 and the extension of such decoder 101 acts as an interface between the microprocessor 82 and the various peripherals within the interceptor. Memory decoder 104 interfaces with the micro interface and selects one memory location at a time.

Figure 6:
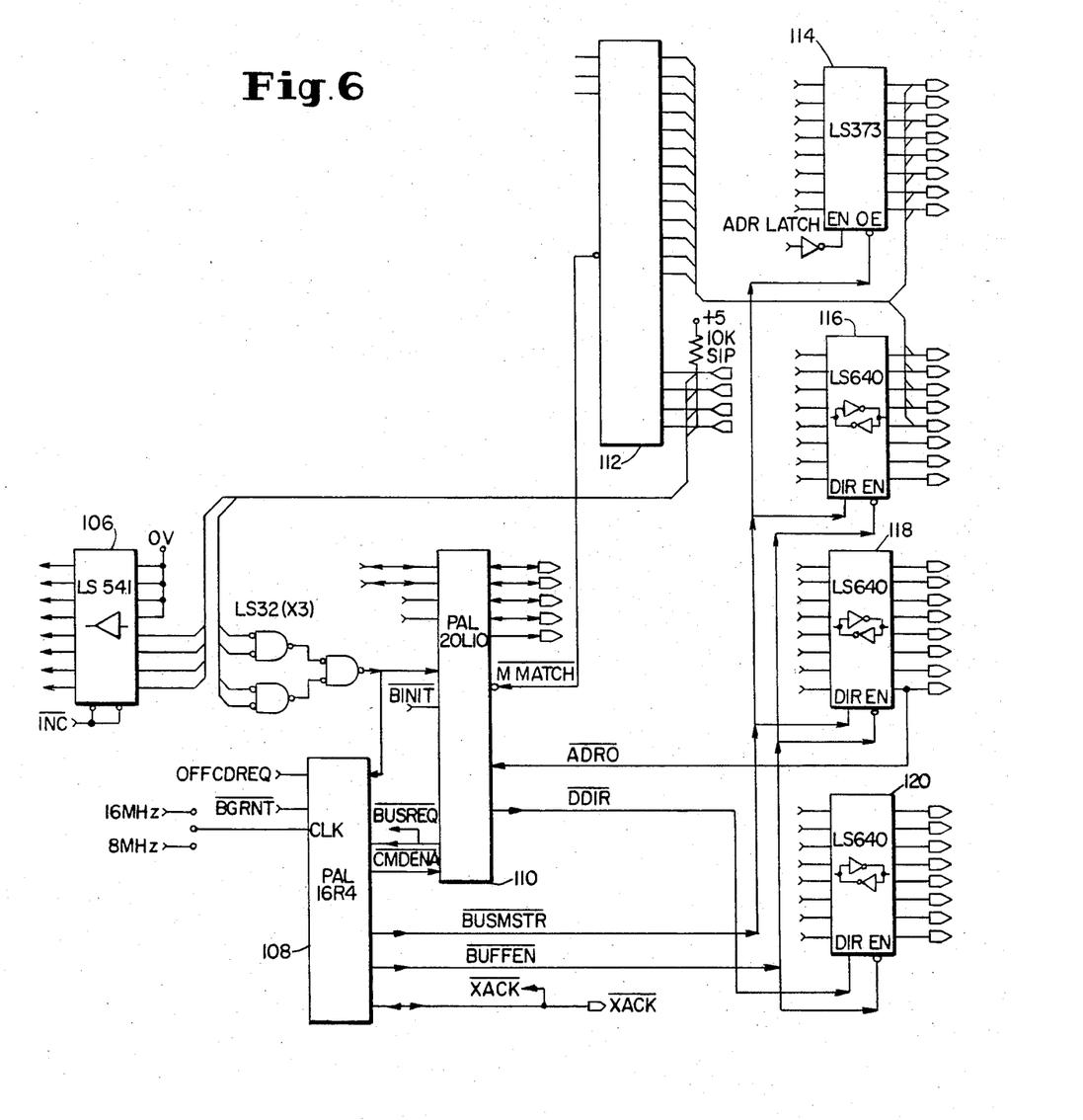
FIG. 6 is a schematic circuit diagram of an additional portion of the microprocessor section of the interceptor of the present invention.
Figure 7:
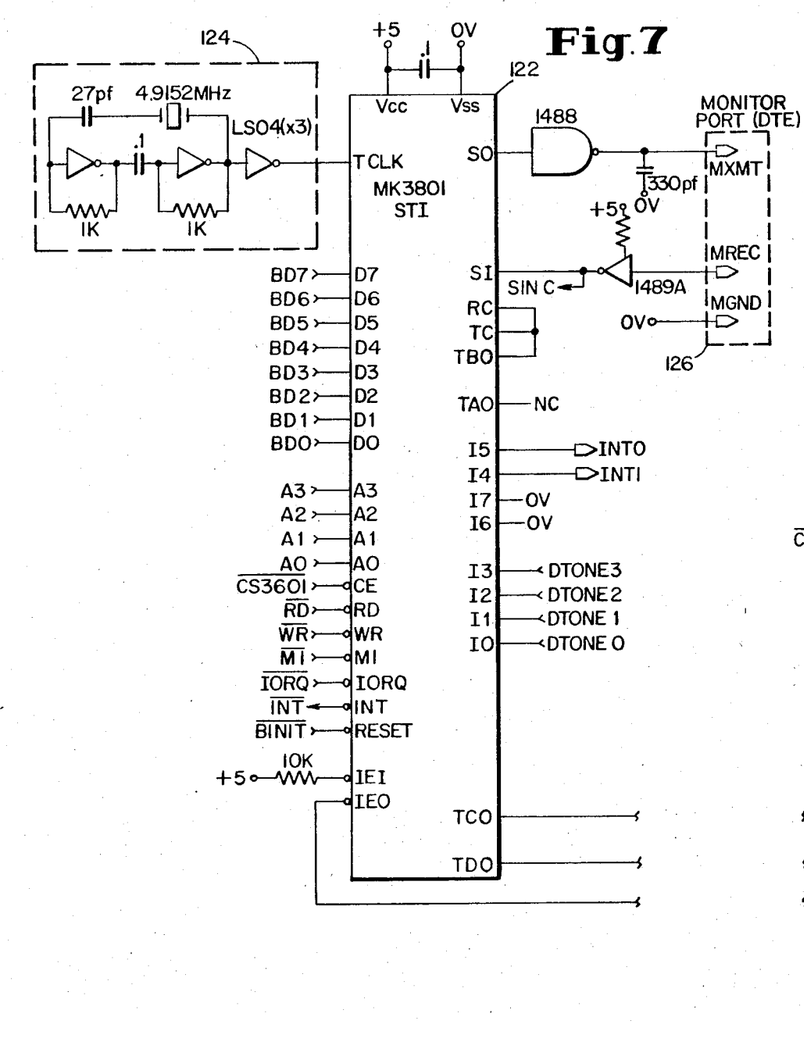
FIG. 7 is a schematic circuit diagram of the final portion of the microprocessor section of the interceptor of the present invention.

Further sections of the microprocessor system are shown in FIGS. 6 and 7. In FIG. 6, the circuit includes: a read address interface 106; control signal interfaces 108, 110 and 112 that are connected to the busses; extended address latch 114; address buffers 116 and 118; and data buffer 120. The portion of the microprocessor system shown in FIG. 7 includes a multipurpose interface chip 122, clock generator 124 which generates clock signals for serial communications, and a monitor port 126 which acts as a serial communication interface. Multipurpose chip 122 provides the output baud rate clock signals for serial communication, with such signals being provided on outputs TBO, TCO and TDO. Moreover, interrupt signals are provided to the microprocessor on output lines INT0 and INT1.

Figure 8:
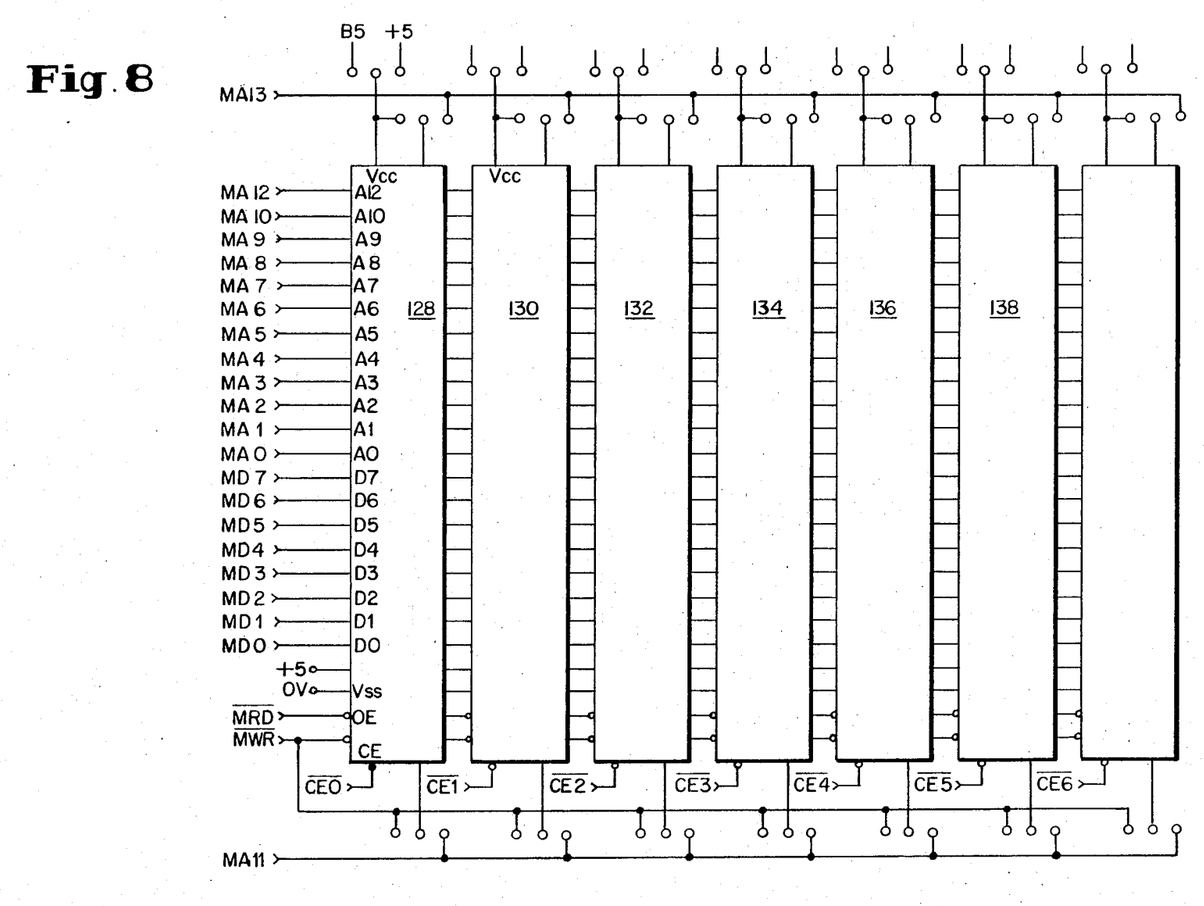
FIG. 8 is a schematic circuit diagram of the ROM and RAM of the interceptor of the present invention.

The memory circuits of the interceptor are shown in FIG. 8. Memory circuits 128 and 130 can be used for the control program; these two memories can be either ROMs or RAMs. Additional memory circuits 132, 134, 136 and 138 are used for storing the data for each of the telephone extensions within the PBX system.

Figure 9:
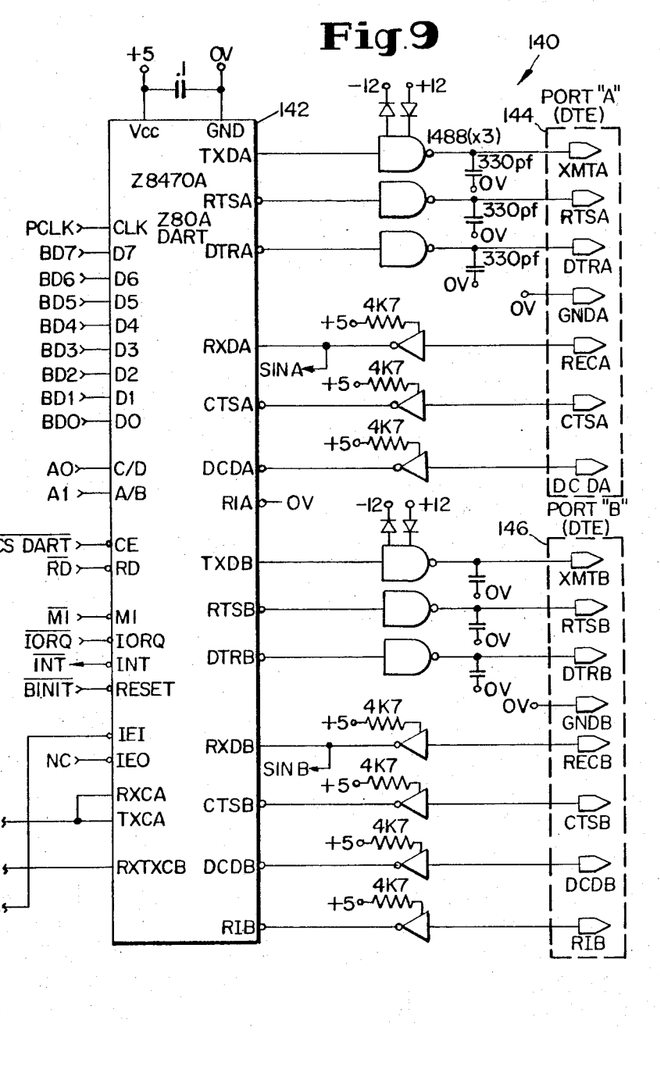
FIG. 9 is a schematic circuit diagram of the I/O ports of the interceptor of the present invention.

The input/output ports 140 are shown in FIG. 9. A Z80A Dart 142 provides two channels of RS 232 communications. The output of processor 142 is connected to two RS 232C ports 144 and 146.

Figure 10:
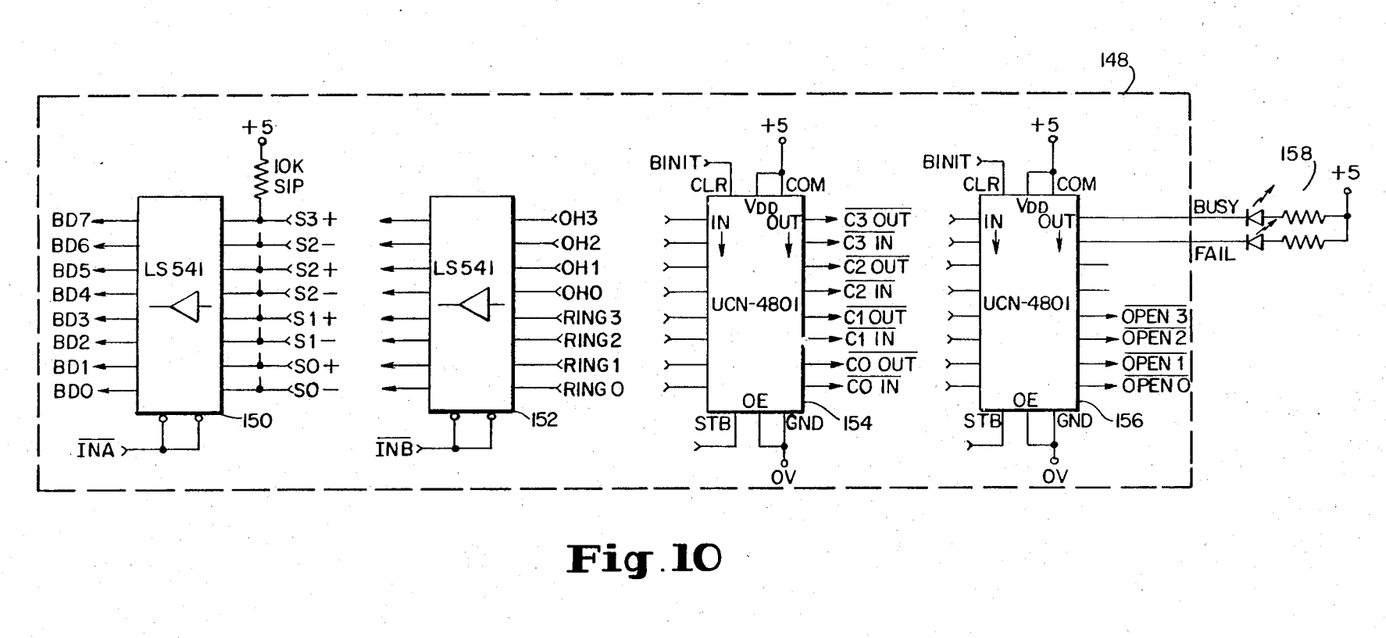
FIG. 10 is a schematic circuit diagram of various input/output ports for control of other various components of the interceptor of the present invention.

The interconnections between the various control sections of the interceptor is handled through input/output control ports 148 which are shown in FIG. 10. These control ports include the control ports 150 and 152 for the current sensors for the battery source and for detecting the direction of current flow in the four line circuits connected to the interfaces. Port 152 is connected in the top four connections on the right side of the port to the interface of the tip/ring voltage sensor for sensing the polarity of the DID current on the incoming DID line. The bottom four terminals on the right hand side of port 152 interface with the ring detector input on the battery sink side. Port 154 serves as an interface for controlling the relays on the sink and source sides of the interface section. Port 156 serves as the interface to the isolators for isolating the touch tone noise. Output terminals on port 156 also are connected to status indicators 158.

The present invention may be embodied in other specific forms without departing from the spirit or essential characteristics thereof. The present embodiments are presented merely as illustrative and not restrictive, with the scope of the invention being indicated by the attached claims rather than the foregoing description. All changes which come within the meaning and range of equivalency of the claims are therefore intended to be embraced therein.

What is claimed is:

1. An interceptor for interconnection between a telephone central office and a PBX system, said interceptor comprising:
   (a) first connecting means for connecting said interceptor to an incoming telephone line from the telephone central office, said first connecting means acting as a source port;
   (b) a second connecting means for connecting said interceptor to a PBX, said second connecting means acting as a sink port;
   (c) means for enabling said interceptor to dial any of several telephone extensions coupled to the PBX when an incoming call for one of said extensions is received by said interceptor from the incoming line connected to said first connecting means;
   (d) timing means for determining if such dialed telephone extension has gone unanswered for a preselected period of time; and
   (e) detection means for detecting if the dialed telephone extension is answered.

2. An interceptor according to claim 1 further comprising means for signaling a telephone answering system, connected to said interceptor and substantially free of connection to tip/ring lines of the extensions, regarding an incoming call received on a line connected to said first connecting means if the dialed telephone extension in the PBX remains unanswered for a period of time determined by said timing means for assisting the telephone answering system in answering such incoming call.

3. An interceptor according to claim 2 wherein said detection means for detecting if a telephone extension in the PBX is answered includes means for sensing a battery current reversal that occurs when a dialed telephone extension is answered and goes into an off-hook condition.

4. An interceptor according to claim 3 wherein said timing means includes means for providing a variable time period and means for enabling a different variable time period to be set for each of the telephone extensions in the PBX to which said interceptor is to be connected.

5. An interceptor according to claim 1 wherein said first connecting means is connected to an incoming DID trunk line, wherein numbers provided through the incoming DID line are associated with different telephone extensions in the PBX and further comprising memory means for storing information relating to each of the telephone extensions coupled to the PBX.

6. An interceptor according to claim 5 wherein said memory means is capable of storing information for up to 1000 DID telephone extension lines.

7. An interceptor according to claim 6 further comprising means for providing a coded dial signal to the PBX for connecting an incoming call on the DID incoming telephone trunk line to a DID telephone extension.

8. An interceptor according to claim 6 further comprising means for signaling a telephone answering system regarding an incoming call received on a line connected to said first connecting means if the dialed telephone extension in the PBX remains unanswered for a period of time determined by said timing means for assisting the telephone answering system in answering such incoming call.

9. An interceptor according to claim 8 wherein said detection means for detecting if a telephone extension in the PBX is answered includes means for sensing a battery current reversal that occurs when a dialed telephone extension is answered and goes into an off-hook condition.

10. An interceptor according to claim 9 wherein said timing means includes means for providing a variable time period and means for enabling a different variable time period to be set for each of the telephone extensions in the PBX to which said interceptor is to be connected.

11. An interceptor according to claim 10 wherein said timing means can be set to a time period between zero and a preset maximum time period.

12. An interceptor according to claim 11 wherein if said timing means is set to a zero time period then said interceptor will not ring the DID telephone extension in the PBX to which an incoming call is directed and will direct such call to the telephone answering system.

13. An interceptor according to claim 11 wherein if said timing means is set at a preset maximum time period then said timing means will not time out and said interceptor will not transfer an incoming call to the dialed DID telephone extension to the telephone answering system.

14. An interceptor according to claim 5 further comprising a plurality of first connecting means and a plurality of second connecting means so that said interceptor is capable of handling a plurality of telephone answering system operators.

15. An interceptor according to claim 14 wherein said interceptor has four first connecting means and four second connecting means so as to be capable of handling four incoming DID telephone trunk lines and being connected to four telephone answering system operators.

16. An interceptor according to claim 14 wherein when the telephone answering system is to answer a call, said interceptor includes means for sending a code to a telephone answering system operator, which code identifies the particular DID telephone extension being called.

17. An interceptor for interconnection between a telephone central office and a PBX system, said interceptor comprising:
(a) first connecting means for connecting said interceptor to an incoming telephone line from the telephone central office, said first connecting means acting as a source port;
(b) a second connecting means for connecting said interceptor to a PBX, said second connecting means acting as a sink port;
(c) means for enabling dialing of any of several telephone extensions coupled to the PBX when an incoming call is received by said interceptor from the incoming line connected to said first connecting means;
(d) timing means coupled to said second connecting means for determining if such dialed telephone extension has gone unanswered for a preselected period of time for eliminating a requirement for use of a tip/ring circuit coupled across each of the telephone extensions coupled to the PBX; and,
(e) detection means for detecting if the dialed telephone extension in the PBX is answered, said detection means including current sensing means for sensing a battery current reversal that occurs when a dialed telephone extension is answered and goes into an off-hook condition.

18. An interceptor according to claim 17 further comprising means for signaling a telephone answering system regarding an incoming call received on a line connected to said first connecting means if the dialed telephone extension in the PBX remains unanswered for a period of time determined by said timing means for assisting the telephone answering system in answering such incoming call.

19. An interceptor according to claim 17 wherein said timing means includes means for providing a variable time period and means for enabling a different variable time period to be set for each of the telephone extensions in the PBX to which said interceptor is to be connected.

20. An interceptor according to claim 17 wherein said first connecting means is connected to an incoming DID trunk line, wherein numbers provided through the incoming DID line are associated with different telephone extensions in the PBX and further comprising memory means for storing information relating to each of the telephone extensions coupled to the PBX.

21. An interceptor according to claim 20 wherein said memory means is capable of storing information for up to 1000 DID telephone extension lines.

22. An interceptor according to claim 21 further comprising means for providing a coded dial signal to the PBX for connecting an incoming call on the DID incoming telephone trunk line to a DID telephone extension.

23. An interceptor according to claim 21 further comprising means for signaling a telephone answering system regarding an incoming call received on a line connected to said first connecting means if the dialed telephone extension in the PBX remains unanswered for a period of time determined by said timing means for assisting the telephone answering system in answering such incoming call.

24. An interceptor according to claim 23 wherein said timing means includes means for providing a variable time period and means for enabling a different variable time period to be set for each of the telephone extensions in the PBX to which said interceptor is to be connected.

25. An interceptor according to claim 24 wherein said timing means can be set to a time period between zero and a preset maximum time period.

26. An interceptor according to claim 25 wherein if said timing means is set to a zero time period then said interceptor will not ring the DID telephone extension in the PBX to which an incoming call is directed and will direct such call to the telephone answering system.

27. An interceptor according to claim 25 wherein if said timing means is set at a preset maximum time period then said timing means will not time out and said interceptor will not transfer an incoming call to the dialed DID telephone extension to the telephone answering system.

28. An interceptor according to claim 20 further comprising a plurality of first connecting means and a plurality of second connecting means so that said interceptor is capable of handling a plurality of telephone answering system operators.

29. An interceptor according to claim 28 wherein said interceptor has four first connecting means and four second connecting means so as to be capable of handling four incoming DID telephone trunk lines and being connected to four telephone answering system operators.

30. An interceptor according to claim 28 wherein when the telephone answering system is to answer a call, said interceptor includes means for sending a code to a telephone answering system operator, which code identifies the particular DID telephone extension being called.

31. A series connected interceptor for interconnection in series between a telephone central office and a PBX system, said interceptor comprising:
(a) first connecting means for connecting said interceptor to an incoming DID trunk line from the telephone central office, said first connecting means acting as a source port so that said interceptor looks like a PBX system to the telephone central office;
(b) a second connecting means for connecting said interceptor to a PBX system, said second connecting means acting as a sink port so that said interceptor looks like a telephone central office to the PBX system;
(c) means for decoding incoming call signals on the DID trunk line for enabling dialing of any of several telephone extensions coupled to the PBX when an incoming call is received by said interceptor from the incoming DID trunk line connected to said first connecting means; and
(d) means for coupling a telephone answering system to an incoming call received on a line connected to said first connecting means.

32. A series connected interceptor according to claim 31 further comprising timing means for determining if such dialed telephone extension has gone unanswered for a preselected period of time; detection means for detecting if the dialed telephone extension is answered; and, means for assisting in coupling of such incoming call to such telephone answering system if the dialed telephone extension in the PBX remains unanswered for a period of time determined by said timing means.

33. A series connected interceptor according to claim 32 wherein said detection means for detecting if a telephone extension in the PBX is answered includes means for sensing a battery current reversal that occurs when a dialed telephone extension is answered and goes into an off-hook condition.

34. A series connected interceptor according to claim 33 wherein said timing means includes means for providing a variable time period and means for enabling a different variable time period to be set for each of the telephone extensions in the PBX to which said interceptor is to be connected.

35. A series connected interceptor according to claim 31 wherein numbers provided through the incoming DID line are associated with different telephone extensions in the PBX and further comprising memory means for storing information relating to each of the telephone extensions in the PBX for indicating to which telephone extension an incoming call on the DID trunk line should be directed.

36. A series connected interceptor according to claim 35 further comprising means for causing the information stored in said memory means to be selectively changed for enabling an incoming call for a telephone extension in the PBX to be call forwarded to a different telephone extension within the PBX before the incoming call has entered the PBX.

37. A series connected interceptor according to claim 36 wherein said memory means is capable of storing information for up to 1000 DID telephone extension lines.

38. A series connected interceptor according to claim 37 further comprising means for providing a coded dial signal to the PBX for connecting an incoming call on the DID incoming telephone trunk line to a telephone extension in the PBX.

39. A series connected interceptor according to claim 36 further comprising means for signaling a telephone answering system regarding an incoming call received on a line connected to said first connecting means if the dialed telephone extension in the PBX remains unanswered for a period of time determined by said timing means for assisting the telephone answering system in answering such incoming call.

40. A series connected interceptor according to claim 39 wherein said detection means for detecting if a telephone extension in the PBX is answered includes means for sensing a battery current reversal that occurs when a dialed telephone extension is answered and goes into an off-hook condition.

41. A series connected interceptor according to claim 40 wherein said timing means includes means for providing a variable time period and means for enabling a different variable time period to be set for each of the telephone extensions in the PBX to which said interceptor is to be connected.

42. A series connected interceptor according to claim 35 further comprising a plurality of first connecting means and a plurality of second connecting means so that said interceptor is capable of handling a plurality of telephone answering system operators.

43. A series connected interceptor according to claim 42 wherein said interceptor has four first connecting means and four second connecting means so as to be capable of handling four incoming DID telephone trunk lines and being connected to four telephone answering system operators.

44. A series connected interceptor according to claim 42 wherein when the telephone answering system is to answer a call, said interceptor includes means for sending a code to a telephone answering system operator, which code identifies the particular DID telephone extension being called.

* * * * *